United States Patent [19]

Hawkins

[11] 4,004,738
[45] Jan. 25, 1977

[54] METHOD OF AND APPARATUS FOR SHREDDING A WEB OF PLASTIC FILM

[75] Inventor: William E. Hawkins, Circleville, Ohio

[73] Assignee: E. I. Du Pont de Nemours and Company, Wilmington, Del.

[22] Filed: Sept. 19, 1975

[21] Appl. No.: 615,186

[52] U.S. Cl. ................................ 241/29; 241/162; 241/244
[51] Int. Cl.² ........................................ B02C 18/12
[58] Field of Search ................ 241/29, 55, 56, 154, 241/155, 162, 244

[56] References Cited
UNITED STATES PATENTS

| 2,635,693 | 4/1953 | Gibby | 425/298 |
| 3,545,686 | 12/1970 | Brown | 241/243 X |

Primary Examiner—Granville Y. Custer, Jr.

[57] ABSTRACT

A method of shredding a web of material is provided. The web is moved by means of a stream of air provided by rotating impeller blades in a first path toward a shredder outlet. At least a part of the web is shredded in this path by stationary first shredding teeth and the shredded portion is immediately moved out of the outlet by the stream of air. The unshredded portion of the web is pulled from the first path into a second path and shredded as it moves in the second path by means of stationary second shredding teeth positioned at substantially a right angle to the first shredding teeth. Then this shredded part of the web is moved out of the shredder by means of the stream of air.

Apparatus is provided for performing the above-described method. Such apparatus has an inlet duct and an outlet duct which, in part, define the first path, which is substantially vertical (to ground) and the impeller blades are positioned for rotation between these ducts and in the second path, which is circular and substantially horizontal. Each impeller blade carries a first shearing knife and third shredding teeth which cooperate with a stationary second shearing knife and the stationary first and second shredding teeth, which are mounted along an outer arcuate edge and a radial edge of the exit opening of the inlet duct, to shear and shred the web, which may be bead trim from polymeric film. A wrap guard prevents the film, or bead, from wrapping the fan shaft.

7 Claims, 3 Drawing Figures

METHOD OF AND APPARATUS FOR SHREDDING A WEB OF PLASTIC FILM

BACKGROUND OF THE INVENTION

1. Field of the Invention

This invention pertains to solid material comminution or disintegration in which rotating impeller type means provide an air stream for moving the web in paths through a shredder and out an outlet duct.

More particularly, such invention is directed to a method of an apparatus for shredding a web of material of indeterminate length, such as a bead of polymeric film, as it is moved in a direction transverse to movable and stationary shredding means by an air stream.

2. Description of the Prior Art

Apparatus for and methods of shredding a web of material, such as polymeric film, are known to the art.

U.S. Pat. No. 3,545,686 to Brown is typical of such known apparatus for shredding sheets of polymeric materials. In the Brown apparatus, a movable cutting blade having a sawtooth cutting edge and a stationary cutting blade having a sawtooth cutting edge interdigitate upon moving the movable cutting blade for piercing and tearing the polymeric film advanced across and parallel to the stationary cutting blade.

Another apparatus for shredding sheet material, in which the sheet is moved between bed knife teeth and a fly knife, as the sheet is fed or advanced in a direction transverse to the bed knife and fly knife teeth is shown in U.S. Pat. No. 2,635,693 to Gibby. The fly knife is one of a set of such knives uniformly spaced around the face of a rotating disc. The plastic sheet is fed by a pair of nip rollers over the upper face of the bed knife so as to be cut by the fly knives as they descend. The rolls are driven by a suitable drive to advance the sheet a predetermined distance after each fly knife passes and before the next descends. The patent primarily involves the intermeshing bed knife and fly knife, which are adapted to maintain a minimum of clearance upon wearing, machining or sharpening.

One of these problems has been the tendency of the film or the tough, flexible bead trim to wrap the rotor shaft or rotating blades carrying the shredding means. This is particularly true in the case of thin or light gauge films. In many instances, the wrapping of the rotor shaft or blades by the bead or film creates a jerk or pull on the bead causing it to break or the film to tear, and thereby directly cause major interruptions in the film making operation. Further, such apparatus often require very close knife settings or clearances to cause complete shearing, or shredding, of these films, which may have a thickness of as little as 0.00006 of an inch and, of course, bearing tolerances and temperature differentials limit the practical use of apparatus with such close clearance requirements. These clearances also may cause the bead to break or tear due to jerks or pulls on the bead. And, lastly, the tough, flexible nature of the film or bead of polymeric material, particularly oriented polyethylene terephthalate film, along with its thinness, make it an extremely difficult material to handle and shred. All of these problems are solved by the method and apparatus for shredding a web of material, that comprise the instant invention.

Summary of the Invention

Briefly summarized, this invention is a method of shredding a web of material including the steps of:

providing a stream of air in a shredder by rotating a fan having impeller blades;

moving the web by means of the stream of air in a first path;

shredding at least part of the web to form shredded and unshredded portions thereof as the web moves in the first path by means of a web first shredder means, such web as moved in the first path being transverse to the direction of rotation of the blades and to the first shredding means;

immediately moving the shredded portion of the web out of the shredder by means of the stream of air;

pulling the unshredded portion of the web from the first path and into a second path;

shredding the unshredded portion of the web as it moves in the second path, such unshredded web as moved in the second path being transverse to the direction of rotation of the blades and to the second shredding means; and thereafter moving the thus shredded web out of the shredder by means of the stream of air.

More particularly, such invention is a method of shredding a web of material including the steps of:

providing a stream of air in a shredder by rotating a fan having impeller blades, such blades each having a first part of a web shearing means, in the form of a first knife having a smooth edge, mounted at the top thereof facing in the direction of rotation of the impeller blades;

moving the web by means of the stream of air in a first path through an inlet duct having an exit opening defined by lower inner and outer arcuate edges and first and second radial edges of the inlet duct and toward an outlet duct of such shredder whereby to operatively position the web with one of its surfaces urged against a web first shredding means, in the form of stationary first teeth defining a sawtooth edge, mounted on the shredder adjacent such lower outer arcuate edge of the inlet duct and extending into the exit opening, such web as moved in the first path being transverse to the direction of rotation of the blades and to the first teeth of the first shredding means;

shredding at least a part of the web to form shredded and unshredded portions thereof by puncturing and tearing such web on the stationary first teeth of the first shredding means by means of the force exerted against the web by the rotating impeller blades;

immediately moving the shredded portion of the web through the outlet duct and out of the shredder by means of the stream of air;

pulling the unshredded portion of the web from the first path and into a second path by means of the impeller blades, such second path being circular and substantially horizontal to ground;

moving the unshredded portion of the web by means of the impeller blades in the second path and into operative relationship with a second part of the web shearing means, in the form of a stationary second knife having smooth edge, and also into operative relationship with a web second shredding means, in the form of stationary second teeth defining a sawtooth edge, such second knife of the web shearing means and such second teeth of the second shredding means being mounted on the shredder adjacent such lower first radial edge of the inlet duct with such second knife being positioned below such second teeth, such unshredded portion of the web as moved in the second path being transverse to the direction of rotation of the blades and to the second knife of the web shearing means and to the second teeth of the second shredding means;

shearing that portion of the unshredded portion of the web thicker than the clearance between the first and second knives of the web shearing means as the smooth edge of the first knife mounted on and carried by each rotating impeller blade moves under the smooth edge of the stationary second knife of the web shearing means;

shredding that portion of the unshredded web less than the clearance between the first and second knives of the web shearing means by puncturing and tearing it on the stationary second teeth of the second shredding means as each impeller blade moves under such second teeth; and thereafter moving the thus shredded web through the outlet duct and out of the shredder by means of the stream of air.

In a preferred embodiment, the unshredded portion of the web is moved into operative relationship with the stationary second knife of the web shearing means and with the stationary second teeth of the second shredding means by means of third teeth defining a sawtooth edge mounted on each impeller blade whereby to assist in the shredding of the unshredded portion of the web.

In use, the method is particularly adapted in shredding a web of polyethylene terephthalate film including a thickened bead formed during manufacture thereof.

In performing this method, an apparatus for shredding such web of material is provided including:

a shredder having a body defining an enclosure;

a rotatable fan having impeller blades for providing a stream of air in the shredder mounted for rotation within the enclosure, such blades each having a first part of a web shearing means, in the form of a first knife having a smooth edge, mounted at the top thereof facing in the direction of rotation of the impeller blades;

an inlet and outlet duct mounted on such body, such inlet duct having an exit opening defined by lower inner and outer arcuate edges and first and second radial edges thereof, such inlet and outlet ducts together defining, in part, a first path;

a web first shredding means, in the form of stationary first teeth defining a sawtooth edge, mounted on the shredder body adjacent such lower outer arcuate edge of the inlet duct, and extending into the exit opening, such first path being transverse to the direction of rotation of the blades and to the first teeth of the first shredding means;

means for rotating such fan and thereby shredding at least a part of the web moving in such first path to form shredded and unshredded portions thereof by puncturing and tearing such web on the stationary first teeth of the first shredding means by means of the force exerted against the web by the rotating impeller blades;

such rotation of the fan providing a stream of air:

for moving the web in the first path, for immediately moving the shredded portion of the web through the outlet duct and out of the shredder by means of the stream of air, and for pulling the unshredded portion of the web from the first path and into a second path by means of the impeller blades, such second path being circular and substantially horizontal to ground; and a second part of the web shearing means, in the form of a stationary second knife having a smooth edge, and a web second shredding means, in the form of stationary second teeth defining a sawtooth edge both mounted on the shredder body adjacent such first radial edge of the duct, such second knife of the web shearing means being positioned below such second teeth of the web second shredding means, such unshredded web as moved in the second path being transverse to the direction of rotation of the blades and to the second knife and second teeth;

such rotation of the fan:

shearing that portion of the unshredded portion of the web thicker than the clearance between the first and second knives of the web shearing means as the smooth edge of the first knife mounted on each rotating impeller blade moves under the smooth edge of the stationary second knife of the web shearing means mounted on the shredder body and, shredding that portion of the unshredded web less than the clearance between the first and second knives of the web shearing means by puncturing and tearing such web on the stationary second teeth of the second shredding means as each impeller blade moves under the second teeth of the web second shredding means; and thereafter moving the thus shredded web through the outlet duct and out of the shredder by means of the stream of air.

To prevent wrapping of the shaft, a stationary cylindrical wrap guard is positioned around the rotor shaft at the uppermost, intermost part of each impeller blade.

This invention solves the problems previously mentioned as existent in the prior art by providing an effective method and apparatus for shredding polymeric film, which may include difficult-to-shred bead trim, without wrapping of the rotor, with ease of shredding and without requiring critical knife tolerances and the like. These problems are basically solved by such invention by providing a stream of air in the first path and by moving the web in this path and toward the outlet opening of the outlet duct, instead of directly against shearing or shredding means. By moving the web in this first path, using this stream of air, created by the rotating impeller blades and then in a circular substantially horizontal second path intermediate this first path and by using the apparatus structure previously described, it is possible always to present the surface of the film transverse to (and substantially perpendicular to) the shearing and shredding means during the act of shearing and shredding. This enables the shredding to take place in an efficient, effective manner and in so doing gives to the shredder arts a capability heretobefore not available to it.

DESCRIPTION OF THE PREFERRED EMBODIMENT

Figure 1:
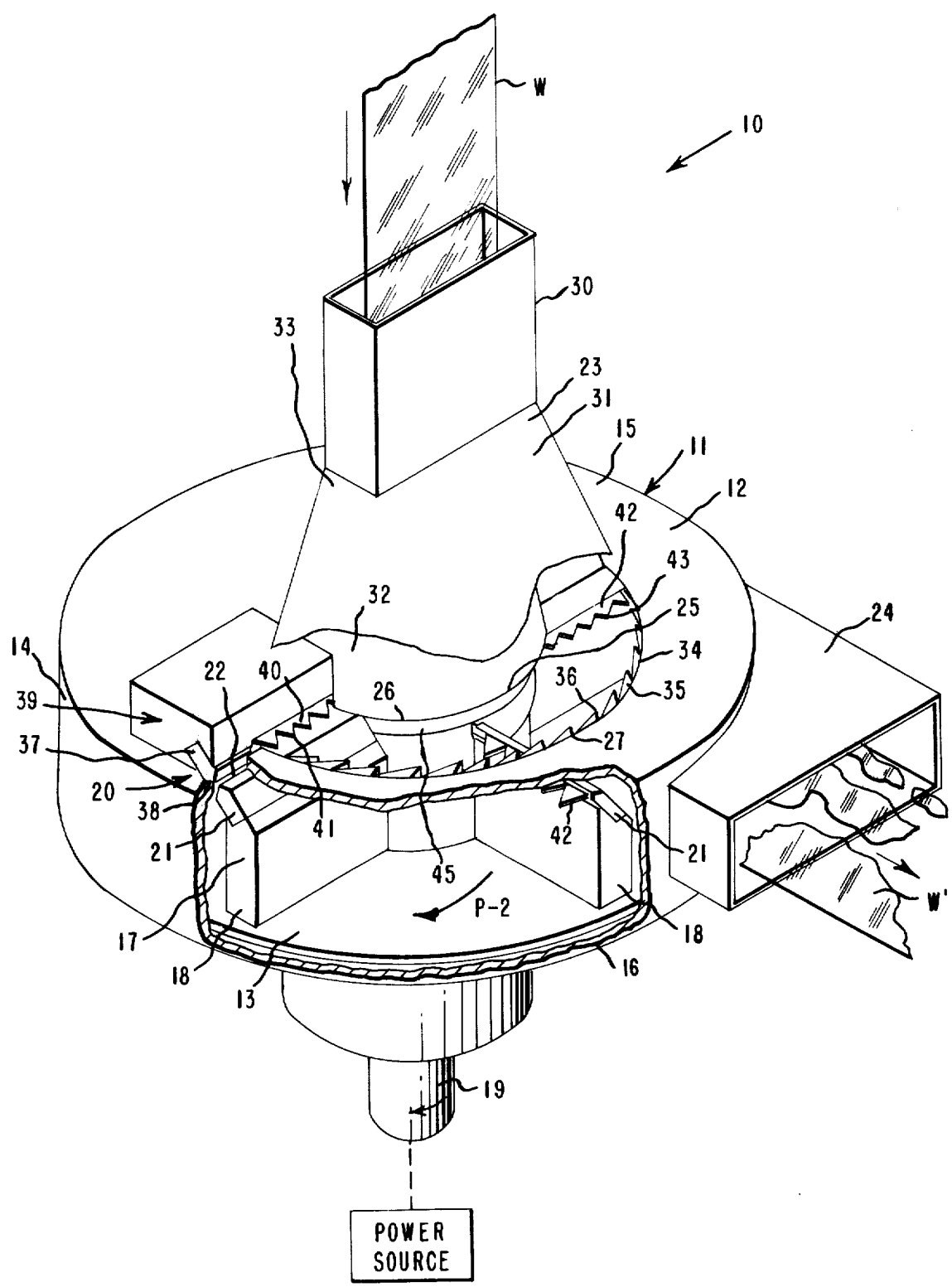
FIG. 1 is a partly cut-away perspective view of an apparatus of this invention.

Referring to the drawing, there is shown a preferred apparatus, generally designated 10, of this invention for shredding a web W of material, such as polymeric film bead trim.

Such apparatus 10 essentially comprises a shredder 11 having a body 12 defining an enclosure 13. The body 12 is formed of a generally cylindrical upstanding wall 14 and top and bottom walls 15 and 16 and means are provided for moving the unshredded web W into the shredder, and specifically into the enclosure 13 where the shredding work occurs, and out of shredder, as will be explained. A rotatable fan 17 having impeller blades 18 for providing a stream of air in the shredder 11 is mounted for rotation within the enclosure 13. The fan 17 is driven by a rotatable shaft 19, through a suitable power source.

The blades 18 each have a first part of a web shearing means 20, in the form of a first knife 21 having a smooth edge 22, mounted at the top thereof facing in the direction of rotation of the impeller blades 18 as shown by the arrow in FIG. 1.

Figure 2:
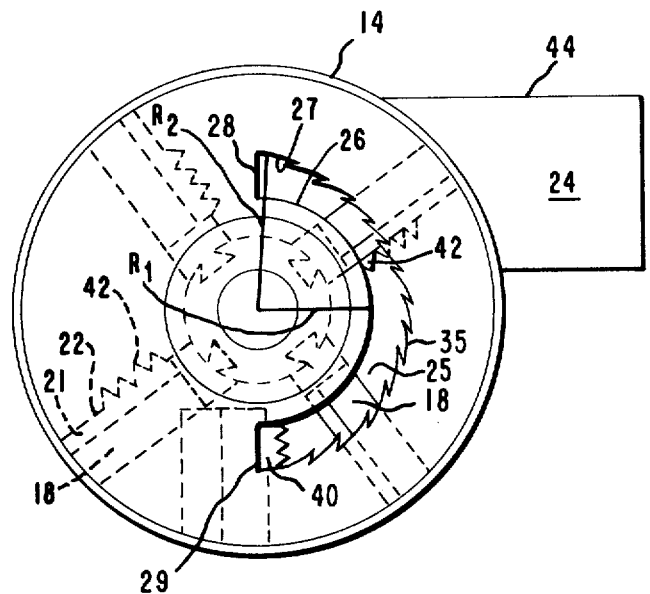
FIG. 2 is a plan view, partly sectional of such apparatus.

An inlet duct 23 and an outlet duct 24 are mounted on the body 12. Such inlet duct 23 has an exit opening 25 defined by inner and outer arcuate edges 26 and 27 and, as best seen in FIG. 2, first and second radial edges 28 and 29 at the lowermost part thereof. The inlet and outlet ducts 23 and 24 together define, in-part, a first path P-1 through the shredder 11, as best seen in FIG. 3.

The inlet duct 23 includes a first upper part 30 and a second lower part 31 defined, in the main, by inner and outer walls 32 and 33, in the form of concentric truncated cones. These first and second parts 30 and 31 of the inlet duct 23 define a passageway for guiding the web W of material into the shredder 11 through the exit opening 25. The first upper part 30 of the inlet duct 23 may be of any suitable configuration adapted to receive web as it moves downwardly into the shredder 11. The second lower part 31 of the inlet duct 23 terminates in the exit opening 25, which as defined by the inner arcuate edge 26 with inner radius $R_1$ and the outer arcuate edge 27 with major radius $R_2$, where $R_2$ is greater than $R_1$, has a substantially annular configuration. The radial edges 28 and 29 of the exit opening 25 are spaced apart so that such annular-shaped opening subtends an angle of about 180°.

A web first shredding means 34, in the form of stationary first teeth 35 defining a sawtooth edge 36 is mounted on or formed in the shredder body 12 adjacent such lower outer arcuate edge 27 of the inlet duct 23, and extends into the exit opening 25. In an important aspect of this invention, the first path P-1 is transverse to the direction of rotation of the blades 18 and to these first teeth 35 of the first shredding means 34 and, as best seen in FIG. 3, at approximately a right angle thereto. As the fan 17 is rotated it shreds at least a part of the web W, as it is moved by the stream of air in such first path P-1 to form shredded and unshredded portions thereof by puncturing and tearing the web W on the stationary first teeth 35 of the first shredding means 34 by the force exerted against the web W by the rotating impeller blades 18.

Figure 3:
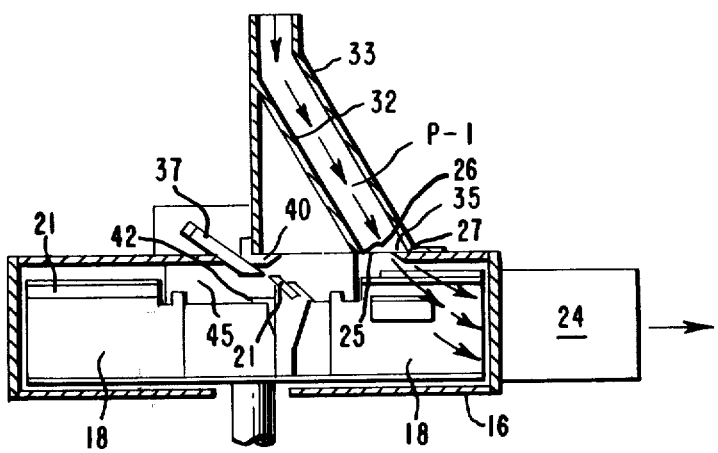
FIG. 3 is a cross-sectional view of the apparatus.

As mentioned, the rotation of the fan 17 provides a stream of air, as shown by the arrows in FIG. 3, for example, for moving the web W in the first path P-1. This stream also immediately moves the shredded portion W' of the web, as shredded by the first teeth 35 of the first shredding means 34, through the outlet duct 24 and out of the shredder 11. Such stream of air, together with the blades 18, in addition further pulls the unshredded portion of the web W from the first path P-1 and into a second path P-2. This path P-2, as best seen in FIG. 1, is substantially circular and substantially horizontal to ground.

A second part of the web shearing means 20, in the form of a stationary second knife 37 having a smooth edge 38, and a web second shredding means 39, in the form of stationary second teeth 40 defining a sawtooth edge 41, are mounted on the shredder body 12 adjacent the second radial edge 29 of the inlet duct 23, with such second knife 37 being positioned below the second teeth 40, as best seen in FIG. 3. The unshredded web as moved in the second path P-2, by means of the stream of air and the impeller blades 18, is transverse to the direction of rotation of the blades 18 and to the second knife 37 and second teeth 40 and at approximately a right angle to such knife 37 and to the second teeth 40. The relative positioning of this knife 37 and these teeth 40 with respect to the web as it is moved in the second path P-2 is important to this invention.

The rotation of the fan 17 shears that portion of the unshredded portion of the web thicker than the clearance between the first and second knives 21 and 37 of the web shearing means 20 as the smooth edge of the first knife 21 mounted on each rotating impeller blade 18 moves under the smooth edge of the stationary second knife 37 of the web shearing means 20 mounted on the shredder body 12 and shreds that portion of the unshredded web less than the clearance between the first and second knives 21 and 37 of the web shearing means 20 by puncturing and tearing such web on the stationary second teeth 40 of the web second shredding means 39 as each impeller blade 18 moves under the second teeth 40 of the second shredding means.

Thereafter, the thus shredded web W' is moved through the outlet duct 24 and out the shredder 11 by means of the stream of air.

The clearance between the knives 21 mounted on the impeller blades 18 and the stationary knife 37 of the web shearing means 20 is not critical. Wider clearances reduce wear and increase throughput, but may increase wear and decrease the capacity of the comminuting or disintegrating chipper to which the finally shredded material is moved. Accordingly, adjustment may be provided, preferably to the stationary knife, to provide proper clearance between the knives to obtain the optimum for the type and quantity of bead trim or other material being shredded. With adjustable non-rotating knives it is also possible to readjust clearances to compensate for wear.

In a preferred embodiment, the unshredded portion of the web is moved into operative relationship with the stationary second knife 37 of the web shearing means 20 and with the stationary second teeth 40 of the second shredding means 39 in part by means of third teeth 42 defining a sawtooth edge 43 mounted on each impeller blade 18 whereby to assist in the shredding of the unshredded portion of the web W.

Preferably, the outlet duct 24 extends tangentially from a location substantially adjacent the first radial edge 28 of the inlet duct 23, for not more than 60° around the circumference of the body and the outer wall 44 is substantially tangent to the circular wall 14 of the shredder body 12 thereby enabling streamline flow of shredded material W' as expelled by the action of the air stream and centrifugal force.

A stationary cylindrical wrap guard 45 preferably is positioned around the shaft 19 at the lowermost, intermost part of each impeller blade 18, as best seen in FIGS. 1 and 3, for preventing the bead trim from wrapping such shaft. In handling certain tough polymeric film bead trim, such as oriented polyethylene terephthalate, this guard, as thus positioned, is often the key to utility of this invention.

As previously stated, this invention is an improved method of and apparatus for shredding such difficult-to-shred materials as film bead trim waste formed in the production of polymeric film, such as biaxially oriented polyester polyethylene terephthalate film. The invention further is particularly adapted to shredding beads of lighter guage film, such as 0.25 mil (6.25 micron) film, in which the bead is thin, 2–5 mils (50–125 microns), and tends to crystallize little in casting and is more highly oriented and tougher than the bead from heavier gauge film, 2 mils (50 microns) and greater, which crystallizes extensively upon quenching, thereby preventing significant orientation and rendering it more brittle and friable.

Bead trim is generally cut from the film as shown, for example, in U.S. Pat. No. 3,762,250 to Huskey after the web of film emerges from the tenter frame. From such tenter frame, the web preferably is fed by nip rolls to a shredder. The problems has been to shred this material in known shredders. This invention obviates that problem.

In general, shredders operate to disintegrate the rope-like bead trim and the narrow width of film slit from the main sheet to produce fragments which are compactible to a greater bulk density for conveying to a chipper which further disintegrates the shredded waste prior to its use as a recycle feed stock or for other utilization or disposal. Known shredders, however, utilizing rotary cutters of various types, are subject to much downtime as a result of wrapping the rotor or knives with the tough flexible bead. This not only causes blockage and interruption of flow of the bead to the chipper, but also applies tension to the bead which is transmitted back to the film beyond the points of shredding; hence, tearing of the film sheet often occurs. Many other types of apparatus designed to solve this problem produce long strands of unshredded bead which reach the chipper, which is unable to handle the rope-like or strand-like material, and it suffers similiar blockages. And, lastly, some shredders require such critical tolerances between driven and fixed knives as to have only a brief service life before shutting down for repairs and adjustments. The shredder, and its method of operation, of the instant invention is an improvement over these known shredders.

Operation

In operation, in the shredder 11 of this invention, the web of material W moving in the main air stream, through the inlet duct 23 first encounters the sharktooth type stationary teeth 35 in the semi-annular exit opening 25. These teeth 35 puncture and tear the material by means of the force exerted from the fan blades. Most of the web immediately tears into small pieces and exits with the main air stream through the exit duct 24. Material which does not puncture or shred is pulled out of the main air stream by the fan blades 18 toward the stationary knife 37. As the rotating knife 21 moves under the stationary knife 37 any material which is thicker than the knife clearance is sheared. Material less than the knife clearance draws tension on the stationary teeth 41 immediately above the stationary knife 37, and is punctured and subsequently tears without transmitting tension to the incoming material. The wrap guard 45 guides untorn material to the stationary knife 37 while preventing wrapping of the shaft 19. The rotating teeth 42 help puncture the material for easier tearing at the stationary knife 37.

During operation, the shredder 11 is most efficiently operated with axis of the inlet duct 23 substantially vertical, and with the knives 21 and blade 18 rotating in a horizontal plane. As a result, the bead trim moves, partly by gravity, into the shredder enclosure 13 and through the annular-shaped exit opening 25 and into shredding position transverse to the teeth 35. The stream of air, generated by the action of the impeller blades 18 throws the bead trim against the sawtooth knife 35 on the outer edge 27 of the exit opening 25. The combined action of the impeller blades 18 and the stationary teeth knife 35 results in a puncturing and tearing action on the bulk of the bead trim as it enters the shredder. Thus, most of the bead trim is shredded and expelled through the exit duct 24 substantially immediately on entrance into the shredder. That portion which is not expelled is carried around an arc by the impeller blades 18 until it engages the knife 21 and teeth 40 at the terminal edge 28 of the exit opening 25 at which point similar puncturing and tearing action results. As a result of the positioning of the bead with the knives and teeth transverse, and basically substantially at right angles to the direction of delivery of the bead, tension-free and highly effective shredding is achieved.

Method

Briefly, the method of shredding a web of material in accordance with this invention includes the steps of:

providing a stream of air in a shredder by rotating a fan having impeller blades;

moving the web by means of the stream of air in the first path;

shredding at least part of the web to form shredded and unshredded portions thereof as the web moves in the first path by means of a web first shredding means, such web as moved in the first path being transverse to the direction of rotation of the blades and to the first shredding means;

immediately moving the shredded portion of the web out of the shredder by means of the stream of air;

pulling the unshredded portion of the web from the first path and into a second path;

shredding the unshredded portion of the web as it moves in the second path, such unshredded web as moved in the second path being transverse to the direction of rotation of the blades and to the second shredding means; and thereafter moving the thus shredded web out of the shredder by means of the stream of air.

In greater detail, such method of shredding includes the steps of:

providing a stream of air in a shredder, such as shredder 11, by rotating in the enclosure 13 therein the fan 17 having impeller blades 18 , such blades each having a first part of a web shearing means 20, in the form of first knife 21, mounted at the top thereof facing in the direction of rotation of the blades;

moving the web W by means of the stream of air in the first path P-1 through the inlet duct 23 having exit opening 25 defined by the inner and outer arcuate edges 26 and 27 and first and second radial edges 28 and 29 of the inlet duct 23 and toward the outlet duct 24 of such shredder whereby to operatively position the web with one of its surfaces urged against the web first shredding means 34, in the form of stationary first teeth 35, mounted on the shredder adjacent the outer arcuate edge 27 of the duct 23 and extending into the exit opening, such web as moved in the first path P-1 being transverse to the direction of rotation of the blades 18 and to the first teeth 35;

shredding at least a part of the web to form shredded and unshredded portions thereof by puncturing and tearing such web on the first teeth 35 of the first shredding means by means of the force exerted against the web by the rotating impeller blades 18;

immediately moving the shredded portion of the web through the outlet duct 24 and out of the shredder 11 by means of the stream of air;

pulling the unshredded portion of the web from the first path P-1 and into the second path P-2 by means of the impeller blades 18, such second path being circular and substantially horizontal to ground;

moving the unshredded portion of the web by means of the impeller blades 18 in the second path P-2 and into operative relationship with a second part of the web shearing means 20, in the form of the stationary second knife 37, and also into operative relationship with the web second shredding means 39, in the form of stationary second teeth 40, such second knife 37 of the web shearing means and such second teeth 40 of the second shredding means being mounted on the shredder 11 adjacent the first radial edge 28 of the duct 23 with the second knife 37 being positioned below such second teeth 40, such unshredded portion of the web as moved in the second path P-2 being transverse to the direction of rotation of the blades 18 and to the second knife 37 and to the second teeth 40;

shearing that portion of the unshredded portion of the web thicker than the clearance between the first and second knives 21 and 37 of the web shearing means 20 as the smooth edge of the first knife 21 mounted on and carried by each rotating impeller blade 18 moves under the smooth edge of the stationary second knife 37 of the web shearing means;

shredding that portion of the unshredded web less than the clearance between the first and second knives 21 and 37 of the web shearing means by puncturing and tearing it on the stationary second teeth 40 of the second shredding means 39 as each impeller blade 18 moves under such second teeth 39; and thereafter moving the thus shredded web through the outlet duct 24 and out of the shredder 11 by means of the stream of air.

Preferably, in such method, the unshredded portion of the web is moved into operative relationship with the stationary second knife 37 of the web shearing means and with the stationary second teeth 40 of the second shredding means by means of third teeth 42 mounted on each impeller blade 18 whereby to assist in the shredding of the unshredded portion of the web.

Lastly, in the method, the web is prevented from wrapping around the shaft 19, to which the impeller blades 18 are attached at their inner ends thereof, by means of a wrap guard 45, which wrap guard guides the unshredded portion of the web into operative relationship with the stationary second knive of the web shearing means.

This method, and apparatus for performing it, has great utility and provides means and a way of shredding a web of material heretofore unknown to the art and gives to such art long sought improvements.

I claim:

1. A method of shredding a web of material including the steps of:
   providing a stream of air in a shredder by rotating a fan having impeller blades;
   moving the web by means of the stream of air in a first path;
   shredding at least part of the web to form shredded and unshredded portions thereof as the web moves in the first path by means of a web first shredder means, such web as moved in the first path being transverse to the direction of rotation of the blades and to the first shredding means;
   immediately moving the shredded portion of the web out of the shredder by means of the stream of air;
   pulling the unshredded portion of the web from the first path and into a second path;
   shredding the unshredded portion of the web as it moves in the second path, such unshredded web as moved in the second path being transverse to the direction of rotation of the blades and to the second shredding means; and
   thereafter moving the thus shredded web out of the shredder by means of the stream of air.

2. A method of shredding a web of material including the steps of:
   providing a stream of air in a shredder by rotating a fan having impeller blades, such blades each having a first part of a web shearing means, in the form of a first knife having a smooth edge, mounted at the top thereof facing in the direction of rotation of the impeller blades;
   moving the web by means of the stream of air in a first path through an inlet duct having an exit opened defined by lower inner and outer arcuate edges and first and second radial edges of the inlet duct and toward an outlet duct of such shredder whereby to operatively position the web with one of its surfaces urged against a web first shredding means, in the form of stationary first teeth defining a sawtooth edge, mounted on the shredder adjacent such lower outer arcuate edge of the inlet duct and extending into the exit opening, such web as moved in the first path being transverse to the direction of rotation of the blades and to the first teeth of the first shredding means;
   shredding at least a part of the web to form shredded and unshredded portions thereof by puncturing and tearing such web on the stationary first teeth of the first shredding means by means of the force exerted against the web by the rotating impeller blades;
   immediately moving the shredded portion of the web through the outlet duct and out of the shredder by means of the stream of air;
   pulling the unshredded portion of the web from the first path and into a second path by means of the impeller blades, such second path being circular and substantially horizontal to ground;
   moving the unshredded portion of the web by means of the impeller blades in the second path and into operative relationship with a second part of the web shearing means, in the form of a stationary second knife having smooth edge, and also into operative relationship with a web second shredding means, in the form of stationary second teeth defining a sawtooth edge, such second knife of the web shearing means and such second teeth of the second shredding means being mounted on the shredder adjacent such lower first radial edge of the inlet duct with such second knife being positioned below such second teeth, such unshredded portion of the web as moved in the second path being transverse to the direction of rotation of the blades and to the second knife of the web shearing means and to the second teeth of the second shredding means;

shearing that portion of the unshredded portion of the web thicker than the clearance between the first and second knives of the web shearing means as the smooth edge of the first knife mounted on and carried by each rotating impeller blade moves under the smooth edge of the stationary second knife of the web shearing means;

shredding that portion of the unshredded web less than the clearance between the first and second knives of the web shearing means by puncturing and tearing it on the stationary second teeth of the second shredding means as each impeller blade moves under such second teeth; and thereafter moving the thus shredded web through the outlet duct and out of the shredder by means of the stream of air.

3. The method of claim 1 wherein:

the unshredded portion of the web is moved into operative relationship with the stationary second knife of the web shearing means and with the stationary second teeth of the second shredding means by means of third teeth defining a sawtooth edge mounted on each impeller blade whereby to assist in the shredding of the unshredded portion of the web.

4. The method of claim 1 including the further step of:

preventing the web from wrapping around a rotor shaft to which the impeller blades are attached at their inner ends thereof by means of a wrap guard and wherein such wrap guard guides the unshredded portion of the web into operative relationship with the second knife of the web shearing means and the second teeth of the second shredding means.

5. An apparatus for shredding a web of material including:

a shredder having a body defining an enclosure;

a rotatable fan having impeller blades for providing a stream of air in the shredder mounted for rotation within the enclosure, such blades each having a first part of a web shearing means, in the form of a first knife having a smooth edge, mounted at the top thereof facing in the direction of rotation of the impeller blades;

an inlet and outlet duct mounted on such body, such inlet duct having an exit opening defined by lower inner and outer arcuate edges and first and second radial edges thereof, such inlet and outlet ducts together defining, in part, a first path;

a web first shredding means, in the form of stationary first teeth defining a sawtooth edge, mounted on the shredder body adjacent such lower outer arcuate edge of the inlet duct, and extending into the exit opening, such first path being transverse to the direction of rotation of the blades and to the first teeth of the first shredding means;

means for rotating such fan and thereby shredding at least a part of the web moving in such first path to form shredded and unshredded portions thereof by puncturing and tearing such web on the stationary first teeth of the first shredding means by means of the force exerted against the web by rotating impeller blades;

such rotation of the fan providing a stream of air:

for moving the web in the first path;

for immediately moving the shredded portion of the web through the outlet duct and out of the shredder and for pulling the unshredded portion of the web from the first path and into a second path along with the impeller blades, such second path being circular and substantially horizontal to ground; and a second part of the web shearing means, in the form of a stationary second knife having a smooth edge, and a web second shredding means, in the form of stationary second teeth defining a sawtooth edge, both mounted on the shredder body adjacent such first radial edge of the inlet duct, such second knife of the web shearing means being positioned below such second teeth of the web second shredding means, such unshredded web as moved in the second path being transverse to the direction of rotation of the blades and to the second knife and second teeth;

such rotation of the fan performing the functions of:

shearing that portion of the unshredded portion of the web thicker than the clearance between the first and second knives of the web shearing means as the smooth edge of the first knife mounted on each rotating impeller blade moves under the smooth edge of the stationary second knife of the web shearing means mounted on the shredder body and;

shredding that portion of the unshredded web less than the clearance between the first and second knives of the web shearing means by puncturing and tearing such web on the stationary second teeth of the second shredding means as each impeller blade moves under the second teeth of the web second shredding means; and thereafter moving the thus shredded web through the outlet duct and out of the shredder by means of the stream of air.

6. The apparatus of claim 5 including:

a stationary cylindrical wrap guard being positioned around the rotor shaft at the intermost part of each impeller blade.

7. The apparatus of claim 5 wherein:

the lower first and second radial edges of the inlet duct are positioned about 180° apart and the outlet duct extends tangentially from a location substantially adjacent the lower second radial edge of the inlet duct for not more than 60° around the circumference of the body.

* * * * *